US009102829B2

(12) United States Patent
Birukov et al.

(10) Patent No.: US 9,102,829 B2
(45) Date of Patent: Aug. 11, 2015

(54) METHOD OF PRODUCING HYBRID POLYHYDROXYURETHANE NETWORK ON A BASE OF CARBONATED-EPOXIDIZED UNSATURATED FATTY ACID TRIGLYCERIDES

(75) Inventors: Olga Birukov, Haifa (IL); Oleg Figovsky, Haifa (IL); Alexander Leykin, Haifa (IL); Raisa Potashnikov, Migdal Ha'emeq (IL); Leonid Shapovalov, Haifa (IL)

(73) Assignees: NANOTECH INDUSTRIES, INC., Daly City, CA (US); POLYMATE, LTD., Migdal Ha'emeq (IL)

( * ) Notice: Subject to any disclaimer, the term of this patent is extended or adjusted under 35 U.S.C. 154(b) by 435 days.

(21) Appl. No.: 13/028,067

(22) Filed: Feb. 15, 2011

(65) Prior Publication Data
US 2012/0208967 A1 Aug. 16, 2012

(51) Int. Cl.
C08L 63/00 (2006.01)
C08L 75/04 (2006.01)
C08G 71/04 (2006.01)

(52) U.S. Cl.
CPC .............. C08L 75/04 (2013.01); *C08G 71/04* (2013.01); *C08L 63/00* (2013.01)

(58) Field of Classification Search
None
See application file for complete search history.

(56) References Cited

U.S. PATENT DOCUMENTS

| 5,175,231 A | 12/1992 | Rappoport et al. |
| 5,855,961 A * | 1/1999 | Hoenel et al. ............. 427/372.2 |
| 6,120,905 A | 9/2000 | Figovsky |
| 6,121,398 A | 9/2000 | Wool et al. |
| 7,045,577 B2 | 5/2006 | Wilkes et al. |
| 7,232,877 B2 | 6/2007 | Figovsky et al. |
| 2010/0144966 A1 | 6/2010 | Birukov et al. |

FOREIGN PATENT DOCUMENTS

| CN | 1880360 A | 12/2006 |
| CN | 101260232 A | 9/2008 |

OTHER PUBLICATIONS

O.L. Figovsky et al., "Cyclocarbonate Based Polymers Including Non-Isocyanate Polyurethane Adhesives and Coatings", *Encyclopedia of Surface and Colloid Science*, V.3, pp. 1633-1653, New York, Taylor & Francis, 2006.
U. Biermann et al., "New Syntheses with Oils and Fats as Renewable Raw Materials for the Chemical Industry", *Angewandte Chemie International Edition*, vol. 39, (13), pp. 2206-2224, 2000.
B. Tamami et al., "Incorporation of Carbon Dioxide into Soybean Oil and Subsequent Preparation and Studies of Nonisocyanate Polyurethane Networks", *Journal of Applied Polymer Science*, 92 (2), pp. 883-891, 2004.
K.M. Doll et al., "Synthesis of Carbonated Fatty Methyl Esters Using Supercritical Carbon Dioxide", *Journal of Agricultural and Food Chemistry*, 53 (24), pp. 9608-9614, 2005.
Holser, "Carbonation of epoxy methyl soyate at atmospheric pressure", *Journal of Oleo Science*, 56 (12), pp. 629-632, 2007.
P.G. Parzuchowski et al., "Epoxy Resin Modified with Soybean Oil Containing Cyclic Carbonate Groups", *Journal of Applied Polymer Science*, vol. 102, No. 3, pp. 2904-2914, 2006.
I. Javni et al., "Soy-based polyurethanes by nonisocyanate route", *Journal of Applied Polymer Science*, 108 (6), pp. 3867-3875, 2008.
Z. Li et al., "Catalytic Synthesis of Carbonated Soybean Oil", *Catalysis Letters*, 123 (3,4), pp. 246-251, 2008.

* cited by examiner

*Primary Examiner* — David Buttner
(74) *Attorney, Agent, or Firm* — TransPacific Law Group; Pavel I. Pogodin, Esq.

(57) ABSTRACT

A method of obtaining hybrid polyhydroxyurethane compositions cross-linked at ambient temperatures. The method comprises: (a) reacting epoxidized unsaturated fatty acid triglycerides with carbon dioxide in the presence of a catalyst to obtain carbonated-epoxidized unsaturated fatty acid triglycerides, wherein conversion of oxyrane groups to 2-oxo-1,3-dioxolane groups (cyclic carbonate groups) for said carbonated-epoxidized unsaturated fatty acid triglycerides ranges from 35% to 85%; (b) mixing and reacting the carbonated-epoxidized unsaturated fatty acid triglycerides with a compound having amine functionality comprising at least one primary amine group realized at stoichiometric or within nearly balanced stoichiometry; (c) mixing and reacting the product of step (b) with a compound having amine functionality comprising at least two primary amine groups realized at excess of an amine-functional compound; (d) subsequently mixing the product of step (c) with a compound having amino-reactive groups.

10 Claims, No Drawings

METHOD OF PRODUCING HYBRID POLYHYDROXYURETHANE NETWORK ON A BASE OF CARBONATED-EPOXIDIZED UNSATURATED FATTY ACID TRIGLYCERIDES

FIELD OF THE INVENTION

The present invention relates to a method of producing hybrid polyhydroxyurethane networks based on unsaturated fatty acid triglycerides. More specifically, the invention relates to networks of hybrid polyhydroxyurethane formed from carbonated-epoxidized soybean oil, compounds having amine functionality comprising at least one primary amine group, and compounds having amino-reactive groups, preferably compounds having epoxy functionality without the use of isocyanate intermediates. In particular, the invention can apply to the preparation of curable coating materials and curable polymeric foams.

BACKGROUND OF THE INVENTION

Production methods of conventional polyurethanes depend on toxic isocyanates, which, in turn, are produced from even more hazardous phosgene. In recent decades, new methods of synthesis of nonisocyanate polyurethanes were developed. Today, polyhydroxyurethane networks based on petroleum-derived nonisocyanate materials are well known. For example, U.S. Pat. No. 5,175,231 issued in 1992 to Rappoport, et al, describes hydroxyurethane that is formed by a new method that does not require the use of isocyanate. The urethane is formed by reacting a compound containing a plurality of cyclocarbonate groups with diamine in which two amine groups have different reactions with cyclocarbonate so as to form a urethane oligomer with terminal amine groups. The compound with cyclocarbonate groups is the product of a reaction of a multifunctional polyetherepoxy with carbon dioxide in the presence of a catalyst, the conversion of epoxy groups into cyclocarbonate groups being 90 to 97 percent. The urethane oligomer can then react with epoxy resin to form cross-linked polyurethane.

U.S. Pat. No. 6,120,905 issued in 2000 to Figovsky describes certain polyhydroxyurethane networks that are produced based on reactions between oligomers comprising terminal cyclocarbonate groups and oligomers comprising terminal primary amine groups. Oligomers comprising terminal cyclocarbonate groups are the products of epoxy resins reacting with carbon dioxide in the presence of a catalyst, the conversion of epoxy groups into cyclocarbonate groups being 85 to 95 percent. U.S. Patent Application Publication No. 20100144966 published in 2010 to Birukov, et al, proposes a liquid cross-linkable oligomer composition that contains a hydroxyurethane-amine adduct and a liquid-reacting oligomer. The hydroxyurethane-amine adduct is a product of an epoxy-amine adduct reacting with a compound having one or more terminal cyclocarbonate groups. U.S. Pat. No. 7,232,877 issued in 2007 to Figovsky, et al, describes a method and an apparatus for synthesis of oligomeric cyclocarbonates from epoxy compounds and carbon dioxide in the presence of a catalyst. Unfortunately, all of these methods rely on the use of commercial petrochemical starting materials.

A detailed review of polyhydroxyurethane networks and methods of preparation was presented by Figovsky and Shapovalov in "Cyclocarbonate-based Polymers Including Non-Isocyanate Polyurethane Adhesives and Coatings" in *Encyclopedia of Surface and Colloid Science*, Somasundaran. P. (Ed), V. 3, 1633 to 1653, New York, Taylor & Francis, 2006.

Potential worldwide demand for replacing petroleum-derived materials with renewable plant-based materials is quite significant from the social and environmental viewpoints. Native oils and fats are the most important renewable raw materials for use in the chemical industry. During the last few years, modern synthetic methods have been applied extensively to fatty compounds for selective functionalization of the alkyl chain and have provided a large number of new fatty compounds from which interesting properties are expected (refer to Biermann U., Friedt W., Lang S., Lühs W., Machmüller G., Metzger J. O., Klaas M. R. G., Schäfer H. J., and Schneider M. P, "New Syntheses with Oils and Fats as Renewable Raw Materials for the Chemical Industry" in *Angewandte Chemie International Edition*, 2000, Volume 39, (13), 2206 to 2224).

Composites based on epoxidized unsaturated fatty acid triglycerides, transformed by various methods, and cured at elevated temperatures are disclosed in U.S. Pat. No. 6,121,398 issued in 2000 to Wool, et al. Among the various derivatives of epoxidized triglyceride oils, products of reactions with carbon dioxide ($CO_2$) deserve special attention (Tamami B., Sohn S., and Wilkes G. L., "Incorporation of Carbon Dioxide into Soybean Oil and Subsequent Preparation and Studies of Nonisocyanate Polyurethane Networks" in *Journal of Applied Polymer Science*, 2004, 92 (2), 883 to 891).

Wilkes, et al, describe a method of carbonation of vegetable oils and preparation of polyhydroxyurethane networks in U.S. Pat. No. 7,045,577 issued in 2006. Reaction of carbonation of epoxidized soybean oil (ESBO) was conducted at ~110° C. and atmospheric pressure in the presence of a catalyst (tetrabutylammonium bromide, TBABr) for approximately 70 h. Conversion of oxyrane (epoxy) groups to 2-oxo-1,3-dioxolane groups (cyclic carbonate groups) in carbonated soybean oil (CSBO) was 94%. To prepare polyhydroxyurethane networks, CSBO was mixed with different amines and heated at 70° C. for 10 h and then at 100° C. for 3 h whereby a non-durable flexible polymeric material (tensile strength $\sigma_t$=0.2-1.5 MPa; elongation at break $\epsilon$=70 to 170%) was obtained.

Synthesis of CSBO from ESBO and $CO_2$ at temperatures of 80 to 120° C. and pressure from atmospheric to 10.6 MPa in the presence of catalysts is described by authors K. M. Doll and S. Z. Erhan of the National Center for Agricultural Utilization Research, U.S. Department of Agriculture, Agricultural Research Service (IL). The improved synthesis of carbonated soybean oil using supercritical carbon dioxide at a reduced reaction time is addressed in *Green Chemistry*, 2005, 7 (12), 849 to 854 by Doll K. M. and Erhan S. Z., "Synthesis of Carbonated Fatty Methyl Esters Using Supercritical Carbon Dioxide" and in *Journal of Agricultural and Food Chemistry*, 2005, 53 (24), 9608-9614; and also by Holser R. A. in "Carbonation of epoxy methyl soyate at atmospheric pressure" in *Journal of Oleo Science*, 2007, 56 (12), 629 to 632.

An epoxy resin modified with CSBO was studied when cured with a polyamine hardener at room temperature (Parzuchowski P. G., Jurczyk-Kowalska M., Ryszkowska J., Rokicki G., "Epoxy Resin Modified with Soybean Oil Containing Cyclic Carbonate Groups" in *Journal of Applied Polymer Science*, 2006, Vol. 102, No. 3, 2904 to 2914). Reaction of carbonation of ESBO was conducted at 130° C. at a pressure of 6 MPa in the presence of a catalyst for approximately 120 hr. Conversion of epoxy groups to cyclic carbonate groups in CSBO was 98.3%.

Each polymer network sample consisted of a commercial epoxy resin, CSBO, and a polyamine-curing agent with two primary amino groups. All formulations were mixed with a stoichiometric amount of amine hardener. The curing process consisted of two methods. In the one-step method, epoxy resin was mixed with CSBO, and then the amine was added and cured at room temperature for 12 h. In the two-step method, carbonated oil was caused to react with the amine hardener at 70° C. for 3 h, and then the resulting viscous adduct was mixed with epoxy resin and cured under the same conditions. The samples contained from 5 to 40% of CSBO and had the following properties: tensile strength $\sigma_t$=40-70 MPa; elongation at break $\epsilon$=6-10%. The products in the one-step method demonstrated higher mechanical properties in comparison with the two-step method.

Polyurethanes obtained by means of a nonisocyanate route were prepared by reacting CSBO with different diamines (Javni I., Hong D. P., and Petrović Z. S., in "Soy-based polyurethanes by nonisocyanate route" in *Journal of Applied Polymer Science*, 2008, 108 (6), 3867 to 3875). Studied was the effect of amine structure and carbonate to amine ratio on polyurethane structure and mechanical, physical, and swelling properties. The reactants, such as 1,2-ethylenediamine, 1,4-butylenediamine, and 1,6-hexamethylenediamine were used with a carbonate-to-amine ratio of the following: 1:0.5, 1:1, and 1:2. Samples were cured at 70° C. for 10 h and then for 3 h at 100° C. Along with urethane formation, the amine group reacted with ester groups to form amides. All amines produced elastomeric polyurethanes with glass transitions between 0 and 40° C. and hardness between 40 and 90 Shore A. At a stoichiometric carbonate-to-amine ratio, mechanical properties were the following: tensile strength $\sigma_t$=4.0-6.0 MPa and elongation at break $\epsilon$=90 to 190%. The reaction of ESBO with carbon dioxide was optimized (temperature 140° C., pressure 10.3 MPa, catalyst TBABr, and duration 25 h) resulting in complete conversion of epoxy to cyclic carbonate groups resulting in polyurethanes with higher cross-linking density and much higher tensile strength than previously reported for similar polyurethanes. Swelling in toluene and water depended on cross-linking density and polarity of polyurethane networks controlled by the cyclic carbonate-to-amine ratio.

Kang, et al (Chinese Patent No. 1880360A, issued in 2006) describe catalytic carbonation of ESBO to 42 to 88% conversion and subsequent generation of nonisocyanate polyurethane (NIPU) using the following procedure: mixing with amine at 70 to 80° C. after synthesis of CSBO, densifying at 100 to 110° C. for 7 to 8 h, solidifying at 90° C. for 24 h, and placing at room temperature for 7 to 9 d. The cured NIPU had a tensile strength of $\sigma_t$=3.1-6.9 MPa and elongation at break $\epsilon$=144 to 206%.

Chinese Patent No. 101260232A issued to Kang, et al, in 2008 relates to a mixed type of NIPU. The composition that contained CSBO, epoxy resin (10 to 50%), amine and catalyst was cured. The curing procedure corresponded to the one used in the aforesaid Chinese Patent No. 1880360A; cured samples had tensile strength and elongation at break from 1.5 MPa and 146% (for 10% addition of epoxy resin) to 49 MPa and less than 1% (for 50% addition of epoxy resin).

In the work by Li Z., Zhao Y., Yan S., Wang X., Kang M., Wang J., and Xiang H. in "Catalytic Synthesis of Carbonated Soybean Oil", *Catalysis Letters*, 2008, 123 (3,4), 246 to 251), CSBO was used as an intermediate for the synthesis of NIPUs. CSBO was prepared by the reaction of ESBO with $CO_2$ using a new composite catalyst comprising $SnCl_4 \cdot 5H_2O$ and TBABr. Results showed an obvious improvement in ESBO conversion using the present composite catalyst under mild conditions. Moreover, it should be noted that very high purity of CSBO was not a prerequisite for synthesis of NIPUs with good performance.

SUMMARY OF THE INVENTION

The inventive methodology is directed to methods and systems that substantially obviate one or more of the above and other problems associated with conventional techniques for producing hybrid polyhydroxyurethane networks.

In accordance with one aspect of the inventive methodology, there is provided a method of producing hybrid polyhydroxyurethane networks on the base of unsaturated fatty acid triglycerides. The following compounds are used as components of the starting material: 1) epoxidized mixture of unsaturated fatty acid triglycerides, specifically ESBO; 2) conventional compounds with epoxy functionalities; and 3) conventional compounds with at least one primary amine functionalities.

The inventive process for producing of hybrid polyhydroxyurethane networks involves the following:

(a) reacting epoxidized unsaturated fatty acid triglycerides with carbon dioxide in the presence of a catalyst to obtain carbonated-epoxidized unsaturated fatty acid triglycerides, wherein conversion of oxyrane groups to 2-oxo-1,3-dioxolane groups (cyclic carbonate groups) for said carbonated-epoxidized unsaturated fatty acid triglycerides ranges from 35% to 85%;

(b) mixing and reacting the carbonated-epoxidized unsaturated fatty acid triglycerides with a compound having an amine functionality comprising at least one primary amine group realized at stoichiometric or within nearly balanced stoichiometry;

(c) mixing and reacting the product of step (b) with a compound having an amine functionality comprising at least two primary amine groups realized at excess of amine functional compound;

(d) subsequent mixing with a compound having amino-reactive groups and selected from the group consisting of (i) a compound having an epoxy functionality, and (ii) a mixture of the compound having epoxy functionality and the carbonated-epoxidized unsaturated fatty acid triglycerides, the ratio of the sum of amino-reactive groups to the sum of amine groups being stoichiometric or within nearly balanced stoichiometry; and (e) curing the composition at ambient temperature.

DETAILED DESCRIPTION OF THE INVENTION

In accordance with one aspect of the inventive methodology, there is provided a method for obtaining hybrid polyhydroxyurethane compositions cross-linked at ambient temperature. One embodiment of the inventive method comprises the following:

(a) reacting epoxidized unsaturated fatty acid triglycerides with carbon dioxide in the presence of a catalyst to obtain carbonated-epoxidized unsaturated fatty acid triglycerides, wherein conversion of oxyrane groups to 2-oxo-1,3-dioxolane groups (cyclic carbonate groups) for said carbonated-epoxidized unsaturated fatty acid triglycerides ranges from 35% to 85%;

(b) mixing and reacting the carbonated-epoxidized unsaturated fatty acid triglycerides with a compound having an amine functionality comprising at least one primary amine group realizes at stoichiometric or within nearly balanced stoichiometry;

(c) mixing and reacting the product of stage (b) with a compound having an amine functionality comprising at least two primary amine groups realized at excess of amine functional compound;

(d) subsequently mixing the product of step (c) with a compound having amino-reactive groups and selected from the group consisting of: (i) a compound having an epoxy functionality, and (ii) a mixture of the compound having an epoxy functionality and the carbonated-epoxidized unsaturated fatty acid triglycerides, the ratio of the sum of amino-reactive groups to the sum of amine groups being stoichiometric or within nearly balanced stoichiometry; and (e) curing the obtained composition at ambient temperature.

In one or more embodiments of the inventive method, step (a) is realized by conventional methods of reacting epoxidized unsaturated fatty acid triglycerides with carbon dioxide at temperatures from 100 to 140° C. and at gauge pressure of 0 to 1.5 MPa, in the presence of a catalyst, preferably TBABr, for 10 to 30 h.

In one or more embodiments of the inventive method, the epoxidized mixture of unsaturated fatty acid triglycerides can be represented by an epoxidized vegetable oil such as soybean oil, linseed oil, cottonseed oil, canola oil, etc. In particular, ESBO contains a mixture of triglycerides of the following unsaturated fatty acids: α-Linolenic acid (7 to 8%); linoleic acid (51 to 54%); and oleic acid (20 to 23%). ESBO is the preferable raw material as widespread industrial product. Examples of ESBO are DRAPEX® 6.8 (Galata Chemicals, LA, USA), DEHYSOL® D 81 (Cognis, Germany), PARAPLEX® G-62 (The HallStar Company, IL, USA), VIKOFLEX® 7170 (Arcema Inc., PA, USA), LESTARFLEX® ME-L (Lestar Quimica S.A., Argentina), and ERGOPLAST® ES (Boryszew S.A., Poland).

In one or more embodiments of the inventive method, examples of compounds having amine functionality and comprising at least one primary amine group suitable for the invention are alkylamines such as octylamine and hexylamine; polyalkylenamines such as diethylenetriamine, triethylenetetramine, tetraethylenepentamine, pentaethylenehexamine, propylenediamine, dipropylenetriamine, N,N-bis-(3-aminopropyl)-methylamine, 2,2,4- and/or 2,4,4-trimethylhexamethylenediamine, N,N'-bis-(3-aminopropyl)-ethylenediamine, neopentanediamine, 2-methyl-1,5-pentanediamine, 1,3-diaminopentane, and hexamethylenediamine; cycloaliphatic amines such as 1,2- or 1,3-diaminocyclohexane, 1,4-diamino-3,6-diethylcyclohexane, 1,2-diamino-4-ethylcyclohexane, 1,4-diamino-3,6-diethyl-cyclohexane, 1-cyclohexyl-3,4-diaminocyclohexane, isophoronediamine, 4,4'-diaminodicyclohexylmethane, and -propane, 2,2-bis-(4-aminocyclohexyl)-methane and -propane, 3,3'-dimethyl-4,4'-diaminodicyclohexyl-methane, 3-amino-1-cyclohexylaminopropane, 1,3- and 1,4-bis-(amininomethyl)-cyclohexane; polyoxyalkylenamines such as poly(oxyethylenediamine), poly(oxyethylenetriamine), poly(oxypropylenediamine), and poly(oxypropylenetriamine); heterocyclic amines such as N-aminoethylpiperazine and 1,4-bis-(3'-aminopropyl) piperazine; and araliphatic amines, those in which aliphatic amine groups are present, are exemplified by meta- and para-xylylenediamines.

In one or more embodiments of the inventive method, the aforementioned amines can be used individually or as a mixture. These amines should be chosen in such a way that for stage (b) they contain at least one free primary amine group and for stage (c) they contain at least two free primary amine groups.

In one or more embodiments of the inventive method, compounds having amino-reactive groups for stage (d) are selected from the group consisting of the following: (i) a compound having epoxy functionality, (ii) carbonated-epoxidized unsaturated fatty acid triglycerides, and (iii) a mixture of compounds (i) and (ii).

In one or more embodiments of the inventive method, suitable epoxy functional compounds (i) are commercially available epoxy resins, polyglycidyl ethers and esters such as polyglycidyl ethers based on polyhydric—mainly dihydric—alcohols, phenols, hydrogenation products of these phenols, and novolaks (reaction products of monohydric or polyhydric phenols with aldehydes, in particular, formaldehyde, in the presence of acid catalysts). Some commercially available epoxy resins also contain monoepoxides as reactive diluents.

In one or more embodiments of the inventive method, examples of epoxy resins are DER.® 324, DER® 330, DER® 331, DEN®431, DEN® 438 (Dow Chemical); Epon® 824, Epon® 828, Eponex® 1510, Heloxy® Modifier 48, Heloxy® Modifier 107, and Heloxy® Modifier 505 (Hexion).

EXAMPLES

Syntheses of Carbonated-Epoxidized Soybean Oil (CESBO)

Step (a)

Synthesis 1

In one or more embodiments of the inventive method, synthesis of CESBO was realized according to the procedure described in U.S. Pat. No. 7,232,877. ESBO (200 g, DRAPEX® 6.8) and TBABr (1 g, Sigma-Aldrich) were loaded into 1 L Parr 4521 Bench Top Reactor (Parr Instrument Co.), the temperature was increased to 120° C., and $CO_2$ was introduced while maintaining gauge pressure at 1.0 MPa. The process was monitored by FTIR spectroscopy (Thermo Scientific Nicolet 380 FT-IR spectrometer) according to formed cyclic carbonate C=O band at 1800-1805 $cm^{-1}$. The reaction was carried out for 40 h, and the achieved conversion of epoxy groups was 85%.

Synthesis 2

In one or more embodiments of the inventive method, synthesis 2 is carried out under the same conditions in Synthesis 1, except that the temperature was 100° C. and the gauge pressure is 1.5 MPa. The reaction was carried out for 20 h, and the achieved conversion of epoxy groups is 60%.

Synthesis 3

In one or more embodiments of the inventive method, synthesis 3 is carried out under the same conditions in Synthesis 1, except that the content of TBABr was 0.4 g, the temperature is 140° C., and the pressure was atmospheric. The reaction is carried out for 25 h, and the achieved conversion of epoxy groups is 35%.

Examples of Preparing Cross-Linked
Polyhydroxyurethane Compositions Steps (b)
Through (e)

Example 1

In one or more embodiments of the inventive method, in step (b), 12.9 g of N-octylamine (Sigma-Aldrich) are added to 42.8 g of CESBO (Synthesis 2); the mixture is stirred at room temperature (hereinafter referred to as RT) for 5 min and aged for 17 h at RT.

In one or more embodiments of the inventive method, in step (c), 39.5 g of trimethylhexamethylenediamine (Vestamin® TMD, Evonik Ind.) are added to mixture of step (b); the composition is stirred at RT for 5 min and aged for 2 h at RT.

In one or more embodiments of the inventive method, in step (d), 23.8 g of composition (c) are mixed with 47 g of epoxy resin DER® 331 at RT for 2 min, and the material is poured into standard sample moulds.

In one or more embodiments of the inventive method, in step (e), the liquid hybrid polyhydroxyurethane composition is cross-linked for 7 days at RT. The cured hybrid polyhydroxyurethane compositions has the following physical and mechanical properties: hardness (Shore D) of 77; tensile strength of 71 MPa; elongation of 5.6%; chemical resistance—weight gain at immersion (25° C.@24 h), %—in water 0.3, in 20% $H_2SO_4$ 0.35, and in 20% NaOH<0.1.

Example 2

In one or more embodiments of the inventive method, in Step (b), 7.9 g of Vestamin® TMD are added to 28.7 g of CESBO (Synthesis 1); the mixture is stirred at RT for 5 min and aged for 4 h at 80° C.

In one or more embodiments of the inventive method, in Step (c), 42.5 g of isophorone diamine (Vestamin® IPD, Evonik Ind.) are added to RT mixture of Step (b) and cooled down to RT; the composition is stirred at RT for 5 min and aged for 2 h at 40° C.

In one or more embodiments of the inventive method, in Step (d), 20.0 g of composition obtained in Step (c) are mixed with 42 g of epoxy resin DEN® 431 at RT for 2 min, and the material is poured into standard sample moulds.

In one or more embodiments of the inventive method, in Step (e), the liquid hybrid polyhydroxyurethane composition is cross-linked for 7 day at RT.

In one or more embodiments of the inventive method, the cured hybrid polyhydroxyurethane compositions has the following physical and mechanical properties: hardness (Shore D) of 81; tensile strength of 75 MPa; elongation of 3.9%.

Example 3

In one or more embodiments of the inventive method, in Step (b), 7.4 g of 1,8-diamino-3,6-dioxaoctane (Jefffamine EDR-148, Huntsman) were added to 28.7 g of CESBO (Synthesis 1); the mixture was stirred at RT for 5 min and aged for 6 h at 50° C.

In one or more embodiments of the inventive method, in Step (c), 39.5 g of Vestamin® TMD are added to the cooled mixture of Step (b) and the mixture is brought to RT; the obtained composition is stirred at RT for 5 min and aged for 2 h at 50° C.

In one or more embodiments of the inventive method, in Step (d), 20.0 g of composition (c) are mixed with 37.8 g of epoxy resin DEN® 431 and 3.6 g of CESBO (Synthesis 1) at RT for 2 min, and the material is poured into standard sample moulds.

In one or more embodiments of the inventive method, in Step (e), the obtained liquid hybrid polyhydroxyurethane composition is cross-linked for 7 days at RT.

In one or more embodiments of the inventive method, the cured hybrid polyhydroxyurethane compositions has the following physical and mechanical properties: hardness (Shore D) of 70; tensile strength of 64 MPa; and elongation of 6.0%.

Example 4

In one or more embodiments of the inventive method, in Step (b), 12.9 g of N-octylamine (Sigma-Aldrich) are added to 77.3 g of CESBO (Synthesis 3); the mixture is stirred at RT for 5 min and aged for 2 h at 80° C.

In one or more embodiments of the inventive method, in Step (c), 42.5 g of Vestamin® IPD are added to mixture (b); the composition is stirred at RT for 5 min and aged for 4 h at RT.

In one or more embodiments of the inventive method, in Step (d), 33.2 g of composition (c) are mixed with 47 g of epoxy resin DER® 331 at RT for 2 min, and the material is poured into standard sample moulds.

In one or more embodiments of the inventive method, in Step (e), the liquid hybrid polyhydroxyurethane composition is cross-linked for 7 days at RT.

In one or more embodiments of the inventive method, the cured hybrid polyhydroxyurethane compositions have the following physical and mechanical properties: hardness (Shore D) of 72; tensile strength of 59 MPa; and elongation of 6.2%.

Although the invention is described with reference to specific embodiments, these embodiments should not be construed as limiting the areas of application of the invention, and any changes and modifications are possible provided that these changes and modifications do not depart from the scope of the attached patent claims. Moreover, other implementations of the invention will be apparent to those skilled in the art from consideration of the specification and practice of the invention disclosed herein. Various aspects and/or components of the described embodiments may be used singly or in any combination in the method of producing a hybrid polyhydroxyurethane network. It is intended that the specification and examples be considered as exemplary only, with a true scope and spirit of the invention being indicated by the following claims.

The invention claimed is:

1. A method of producing a hybrid polyhydroxyurethane network comprising:
   (a) reacting epoxidized unsaturated fatty acid triglycerides with carbon dioxide in the presence of a catalyst to obtain carbonated-epoxidized unsaturated fatty acid triglycerides, wherein conversion of oxyrane groups to 2-oxo-1,3-dioxolane groups (cyclic carbonate groups) for said carbonated-epoxidized unsaturated fatty acid triglycerides ranges from 35% to 85%;
   (b) mixing and reacting the carbonated-epoxidized unsaturated fatty acid triglycerides with a compound having only primary amine functionality and comprising at least one primary amine group realized at stoichiometric or within nearly balanced stoichiometry between cyclic carbonate and primary amine groups to obtain a urethane groups containing product without free amine groups;
   (c) mixing the product of (b) with a compound having amine functionality comprising at least two primary amine groups;
   (d) mixing the product of (c) with a compound having amino-reactive groups and selected from the group comprising: (i) a compound having epoxy functionality, and (ii) a mixture of the compound having epoxy functionality with carbonated-epoxidized unsaturated fatty acid triglycerides, a ratio of the sum of amino-reactive groups to the sum of amine groups being stoichiometric or within nearly balanced stoichiometry; and
   (e) curing the resulting composition at ambient temperature wherein the content of the urethane groups containing product of step (b) in the final polymer matrix ranges from 14.9 to 28.1% by weight.

2. The method of claim 1, wherein the catalyst for the reaction of (a) is tetrabutylammonium bromide.

3. The method of claim 2, wherein the compounds of steps (b) and (c) having amine functionality is selected from a group consisting of (i) aliphatic amines, (ii) cycloaliphatic amines, (iii) polyoxyalkylene amines, and any combination of (i), (ii) and (iii).

4. The method of claim 3, wherein the compounds of steps (b) and (c) having amine functionality contains at least one primary amine group selected from the group consisting of (i) compounds with one primary amine group, (ii) compounds with two primary amine groups, (iii) compounds with three primary amine groups, and any combination of (i), (ii) and (iii).

5. The method of claim 4, wherein the carbonated-epoxidized unsaturated fatty acid triglycerides comprise carbonated-epoxidized soybean oil.

6. The method of claim 1, wherein mixing of the carbonated-epoxidized unsaturated fatty acid triglycerides in (b) is realized with an amine-functional compound having one primary amine group and wherein (c) is realized with amine-functional compounds having two and/or three primary amine groups.

7. The method of claim 5, wherein mixing the carbonated-epoxidized soybean oil in (b) is realized with an amine-functional compound having one primary amine group and (c) is realized with amine-functional compounds having two and/or three primary amine groups.

8. The method of claim 1, wherein the compound having epoxy functionality is selected from the group consisting of (i) diglycidyl ethers of bisphenol-A or bisphenol-F, (ii) polyglycidyl ethers of novolac resin with oxyrane functionality from 2.2 to 4, di- or polyglycidyl ethers of aliphatic polyols, (iii) monofunctional-reactive diluents selected from aliphatic and aromatic glycidyl ethers or esters, and any combination of (i), (ii) and (iii).

9. The method of claim 5, wherein the compound having epoxy functionality is selected from the group consisting of (i) diglycidyl ethers of bisphenol-A or bisphenol-F, (ii) polyglycidyl ethers of novolac resin with oxyrane functionality from 2.2 to 4, di- or polyglycidyl ethers of aliphatic polyols, (iii) monofunctional-reactive diluents selected from aliphatic and aromatic glycidyl ethers or esters, and any combination of (i), (ii) and (iii).

10. The method of claim 7, wherein the compound having epoxy functionality is selected from the group consisting of (i) diglycidyl ethers of bisphenol-A or bisphenol-F, (ii) polyglycidyl ethers of novolac resin with oxyrane functionality from 2.2 to 4, di- or polyglycidyl ethers of aliphatic polyols, (iii) monofunctional-reactive diluents selected from aliphatic and aromatic glycidyl ethers or esters, and any combination of (i), (ii) and (iii).

* * * * *